(12) United States Patent
Yang

(10) Patent No.: US 8,702,290 B2
(45) Date of Patent: Apr. 22, 2014

(54) LIGHT EMITTING MODULE AND CAR THRESHOLD PEDAL THEREWITH

(75) Inventor: Chang-An Yang, New Taipei (TW)

(73) Assignee: Hon Yu Auto Parts Co., Ltd., New Taipei (TW)

( * ) Notice: Subject to any disclaimer, the term of this patent is extended or adjusted under 35 U.S.C. 154(b) by 65 days.

(21) Appl. No.: 13/571,117

(22) Filed: Aug. 9, 2012

(65) Prior Publication Data

US 2013/0272005 A1    Oct. 17, 2013

(30) Foreign Application Priority Data

Apr. 13, 2012 (TW) .............................. 101206834 U

(51) Int. Cl.
*F21V 11/00* (2006.01)

(52) U.S. Cl.
USPC ........... 362/540; 362/185; 362/276; 362/487; 362/544; 362/545

(58) Field of Classification Search
USPC ......... 362/185, 276, 487, 488, 540, 543, 544, 362/545
See application file for complete search history.

(56) References Cited

U.S. PATENT DOCUMENTS

| | | | | |
|---|---|---|---|---|
| 4,777,569 A * | 10/1988 | Wen | ............................... | 362/544 |
| 4,941,074 A * | 7/1990 | DeCosse et al. | ............... | 362/511 |
| 5,590,945 A * | 1/1997 | Simms | .......................... | 362/623 |
| 5,604,480 A * | 2/1997 | Lamparter | .................... | 362/478 |
| 6,883,945 B1 * | 4/2005 | Gonzalez | ...................... | 362/485 |
| 6,924,973 B2 * | 8/2005 | Kim | ............................... | 361/728 |
| 6,971,758 B2 * | 12/2005 | Inui et al. | ...................... | 362/602 |
| 7,350,949 B2 * | 4/2008 | Meinke et al. | ................ | 362/540 |

* cited by examiner

*Primary Examiner* — John A Ward

(74) *Attorney, Agent, or Firm* — Schmeiser, Olsen & Watts, LLP

(57) ABSTRACT

A light emitting module without connecting with an external power supply contains a light emitting panel including a display surface on which a first raised pattern set and a second raised pattern set are formed; a plurality of lighting elements disposed on a bottom plate and secured in the light emitting panel with the bottom plate, each lighting element at least having a first light facing to the first raised pattern set and emitting light and a second light facing to the second raised pattern set and emitting light; a magnetic reed switch mounted in the light emitting panel and electrically connecting with the each lighting element; at least one cell secured in the light emitting panel and electrically coupled with the plurality of lighting elements and the magnetic reed switch.

13 Claims, 6 Drawing Sheets

LIGHT EMITTING MODULE AND CAR THRESHOLD PEDAL THEREWITH

BACKGROUND OF THE INVENTION

1. Field of the Invention

The present invention relates to a light emitting module being applied in a car threshold pedal, and more particularly to a light emitting module having a cell therein without connecting with an external power supply.

2. Description of the Prior Art

Conventional light-emitting threshold of a car disclosed in TW Patent No. M322349 has a cell placed on an external battery pack to supply power to the light-emitting threshold, however, such an external battery pack is still fixed in the car, so the external battery pack is electrically connected with the light-emitting threshold through a wire, thereby influencing an aesthetics appearance and having unsafe problem because of this wire.

The present invention has arisen to mitigate and/or obviate the afore-described disadvantages.

SUMMARY OF THE INVENTION

The primary object of the present invention is to provide a light emitting module having a cell therein without connecting with an external power supply.

To obtain the above objectives, a light emitting module without connecting with an external power supply provided by the present invention contains:

a light emitting panel including a display surface on which a first raised pattern set and a second raised pattern set are formed;

a plurality of lighting elements disposed on a bottom plate and secured in the light emitting panel with the bottom plate, each lighting element at least having a first light facing to the first raised pattern set and emitting light and a second light facing to the second raised pattern set and emitting light;

a magnetic reed switch mounted in the light emitting panel and electrically connecting with the each lighting element;

at least one cell secured in the light emitting panel and electrically coupled with the plurality of lighting elements and the magnetic reed switch;

wherein the first raised pattern set is selected from various letters, symbols, and patterns;

wherein the second raised pattern set is selected from various letters, symbols, and patterns;

wherein the light emitting panel includes a groove defined on a bottom end thereof to receive the plurality of lighting elements, the bottom plate, and the at least one cell;

wherein the light emitting panel includes a cover arranged on the bottom end thereof to close the plurality of lighting elements, the bottom plate, and the at least one cell in the light emitting panel;

wherein the cover is selected from a thin sheet and an adhesive waterproof sheet;

wherein the at least one cell is selected from a button cell;

wherein the each lighting element is selected from a light emitting diode and a light bulb.

Also, to obtain the above objectives, a car threshold pedal with a light emitting module without connecting with an external power supply provided by the present invention contains:

a light emitting panel connected with the car threshold pedal and including a display surface on which a first raised pattern set and a second raised pattern set are formed;

a plurality of lighting elements disposed on a bottom plate and secured in the light emitting panel with the bottom plate, each lighting element at least having a first light facing to the first raised pattern set and emitting light and a second light facing to the second raised pattern set and emitting light;

a magnetic reed switch mounted in the light emitting panel and electrically connecting with the each lighting element;

at least one cell secured in the light emitting panel and electrically coupled with the plurality of lighting elements and the magnetic reed switch.

a pedal served to receive the light emitting panel;

a shielding panel covered on the display surface of the light emitting panel and having a plurality of orifices to expose the first raised pattern set and the second raised pattern set outward;

wherein the pedal includes a plurality of holes to retain the pedal on the car threshold pedal.

wherein the shielding panel includes a plurality of magnets fixed thereon to attach the pedal on the car threshold pedal wherein the shielding panel is a metal sheet.

wherein the shielding panel is a plastic sheet.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
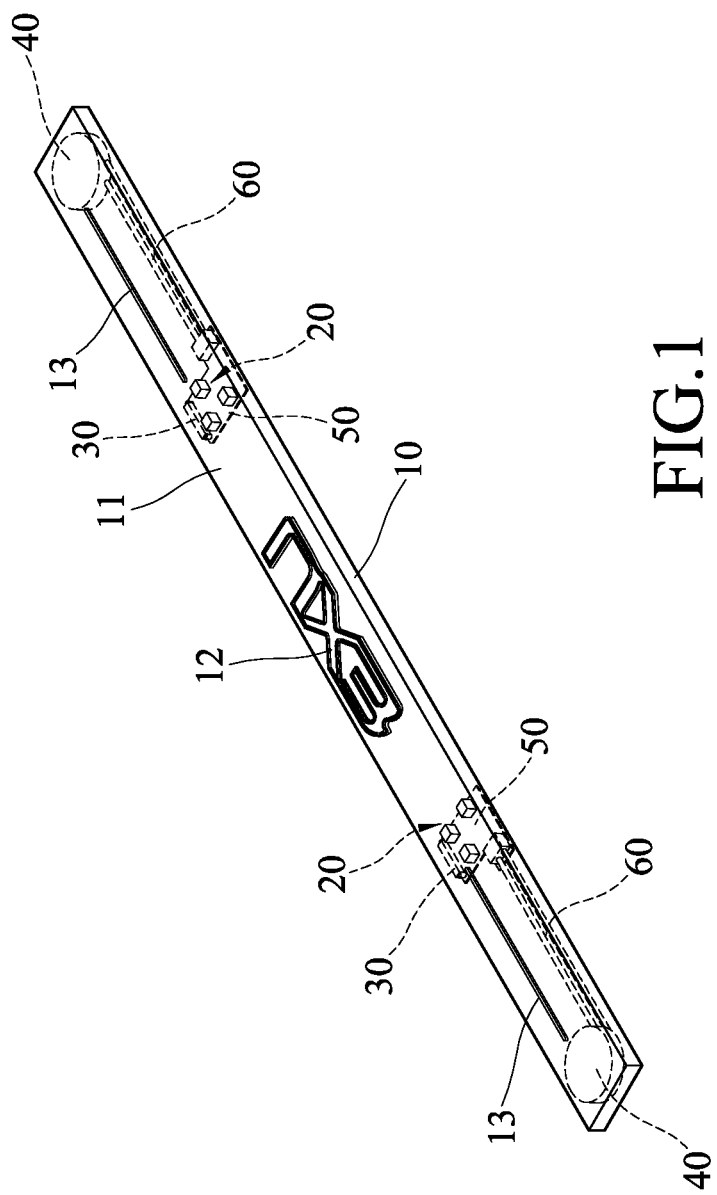
FIG. 1 is a perspective view showing the assembly of a light emitting module according to a preferred embodiment of the present invention.
Figure 2:
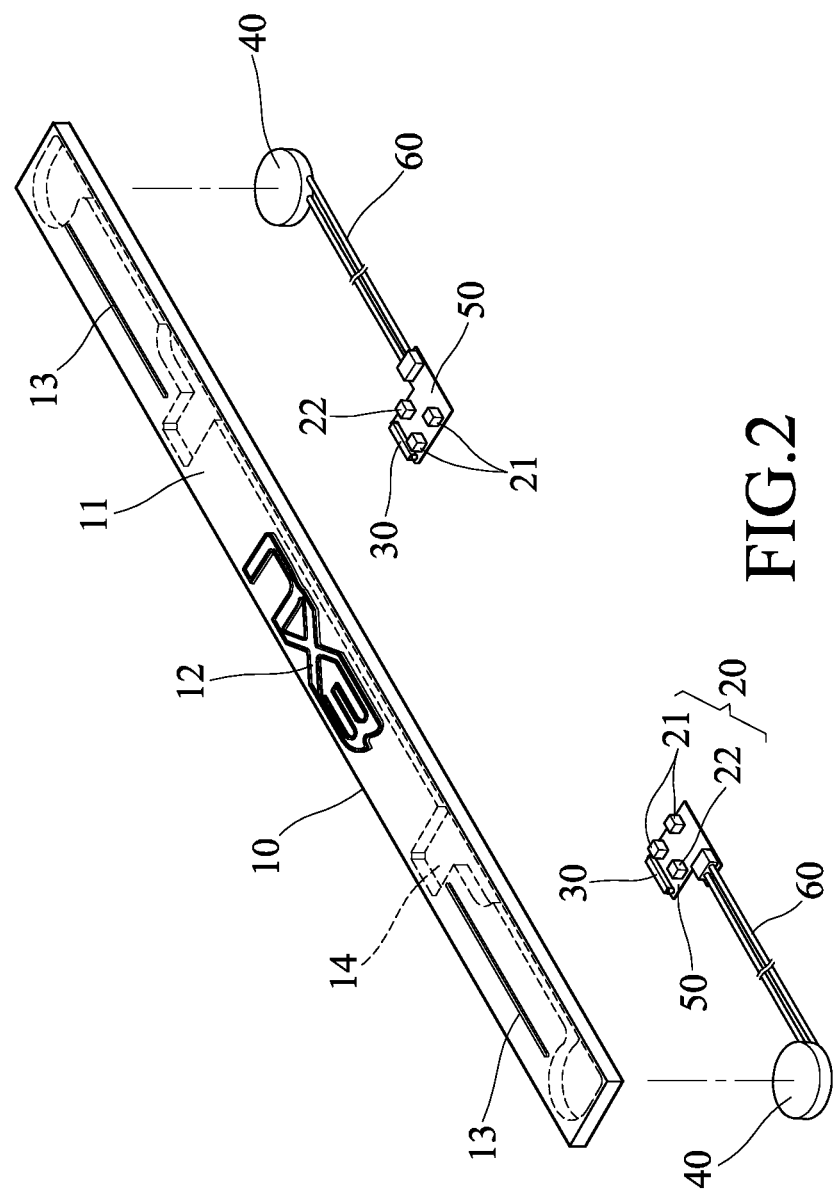
FIG. 2 is a perspective view showing the assembly of the light emitting module according to the preferred embodiment of the present invention.

FIG. 1 is a perspective view showing the assembly of a light emitting module according to a preferred embodiment of the present invention; FIG. 2 is a perspective view showing the assembly of the light emitting module according to the preferred embodiment of the present invention. Referring to FIGS. 1 and 2, the light emitting module comprises a light emitting panel 10, a plurality of lighting elements 20 fixed in the light emitting panel 10, a magnetic reed switch 30, and at least one cell 40.

The light emitting panel 10 includes a display surface 11 on which a first raised pattern set 12 and a second raised pattern set 13 are formed; wherein the first raised pattern set 12 and the second raised pattern set 13 are various letters, symbols, or patterns.

The plurality of lighting elements 20 are disposed on a bottom plate 50 and are secured in the light emitting panel 10 with the bottom plate 50. Each lighting element 20 at least has a first light 21 facing to the first raised pattern set 12 and emitting light and a second light 22 facing to the second raised pattern set 13 and emitting light; wherein the each lighting element 20 is a light emitting diode or a light bulb.

The magnetic reed switch 30 is mounted in the light emitting panel 10 and is electrically connected with the each lighting element 20. In this embodiment, the magnetic reed switch 30 and the each lighting element 20 are fixed on the bottom plate 50.

The at least one cell 40 is secured in the light emitting panel 10 and is electrically with the bottom plate 50 through a wire 60 and is electrically coupled with the plurality of lighting elements 20 and the magnetic reed switch 30. To obtain a thin and light purpose, the at least one cell 40 is selected from a button cell.

Figure 3:
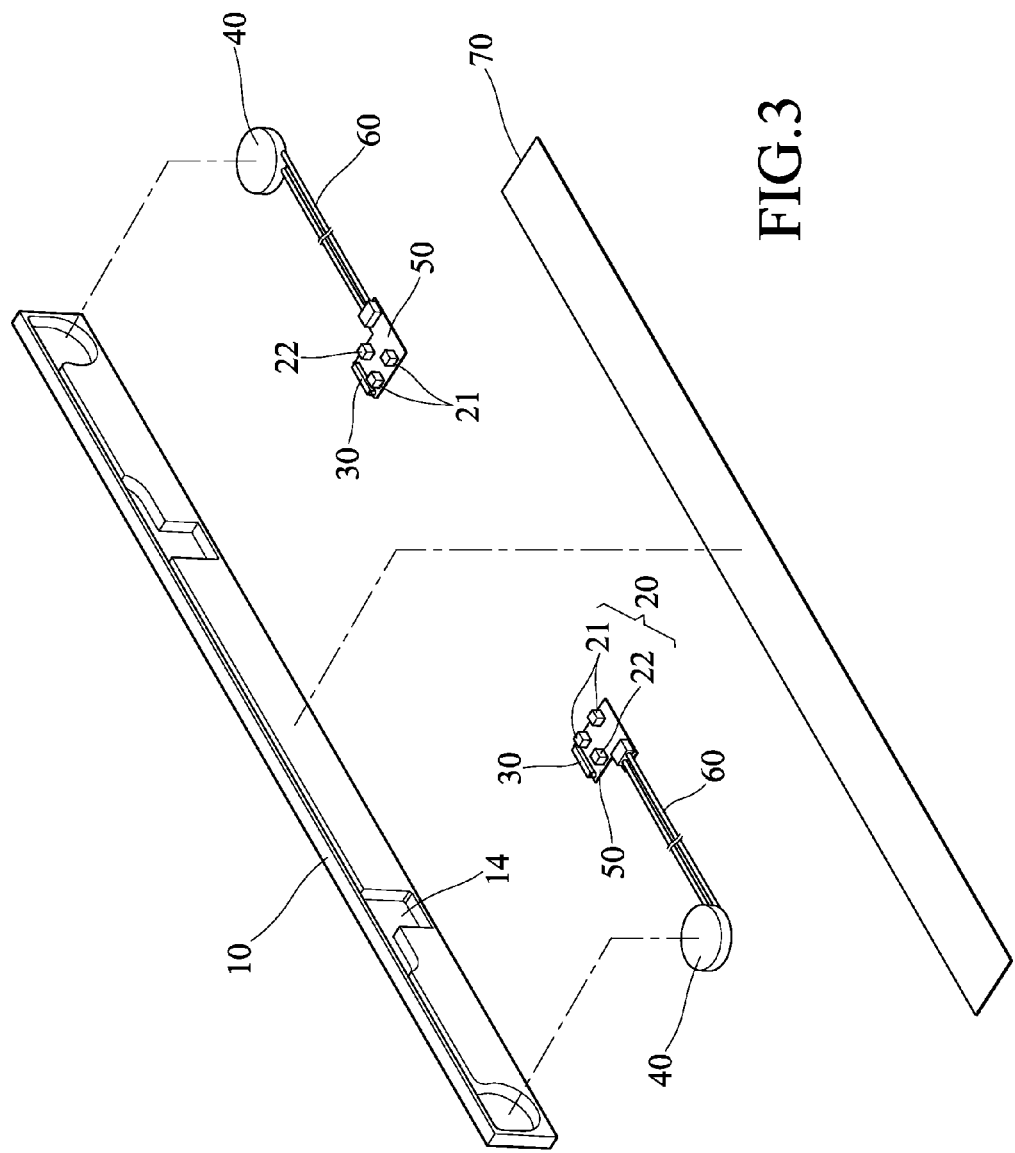
FIG. 3 is another perspective view showing the assembly of the light emitting module according to the preferred embodiment of the present invention.

FIG. 3 is another perspective view showing the assembly of the light emitting module according to the preferred embodiment of the present invention. As shown in FIGS. 2 and 3, the light emitting panel 10 includes a groove 14 defined on a bottom end thereof to receive the plurality of lighting elements 20, the bottom plate 50, and the at least one cell 40. To receive the plurality of lighting elements 20, the bottom plate 50, and the at least one cell 40 in the light emitting panel 10, the light emitting panel 10 includes a cover 70 arranged on the bottom end thereof to close the plurality of lighting elements 20, the bottom plate 50, and the at least one cell 40 in the light emitting panel 10. In this embodiment, the cover 70 is a thin sheet or an adhesive waterproof sheet.

Thereby, the light emitting panel 10 includes the plurality of lighting elements 20 received thereon to emit light without using an external power supply.

Figure 4:
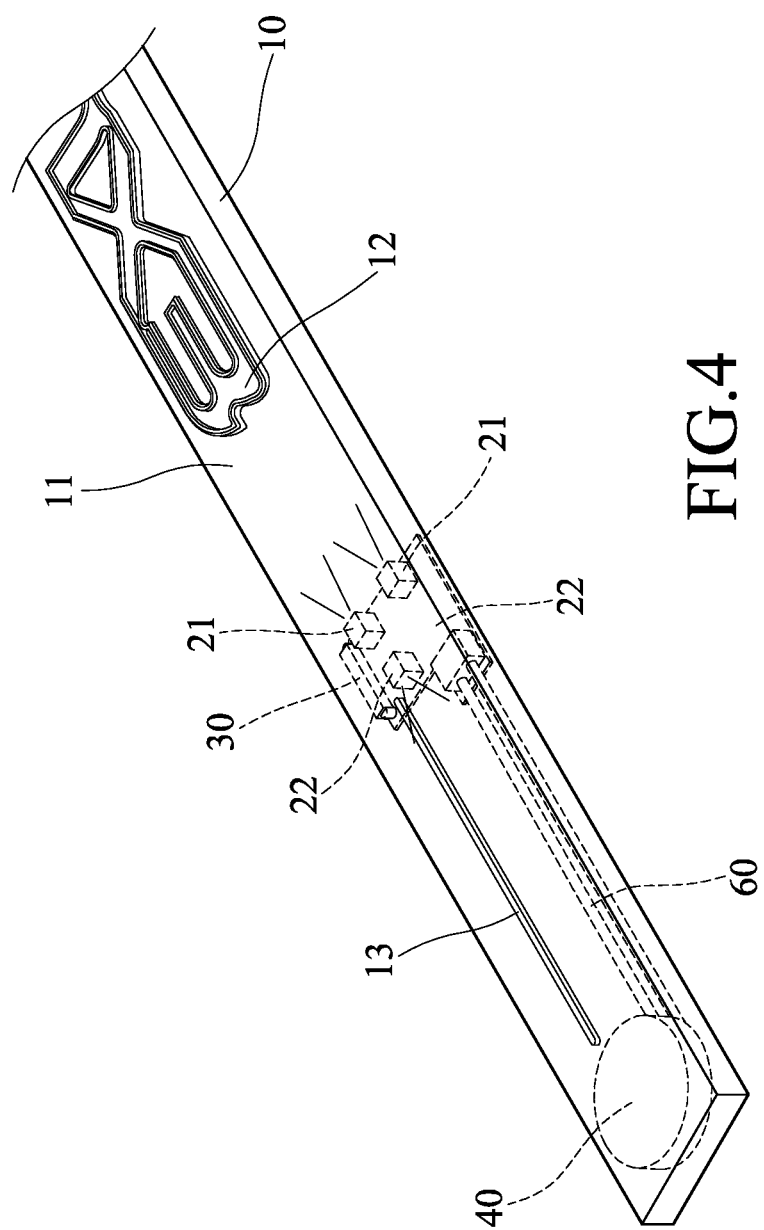
FIG. 4 is a perspective view showing the operation of the light emitting module according to the preferred embodiment of the present invention.

FIG. 4 is a perspective view showing the operation of the light emitting module according to the preferred embodiment of the present invention. When turning on the magnetic reed switch 30, the first light 21 and the second light 22 emit the light by ways of the at least one cell 40 and illuminate the first raised pattern set 12 and the second raised pattern set 13 of the light emitting panel 10.

Figure 5:
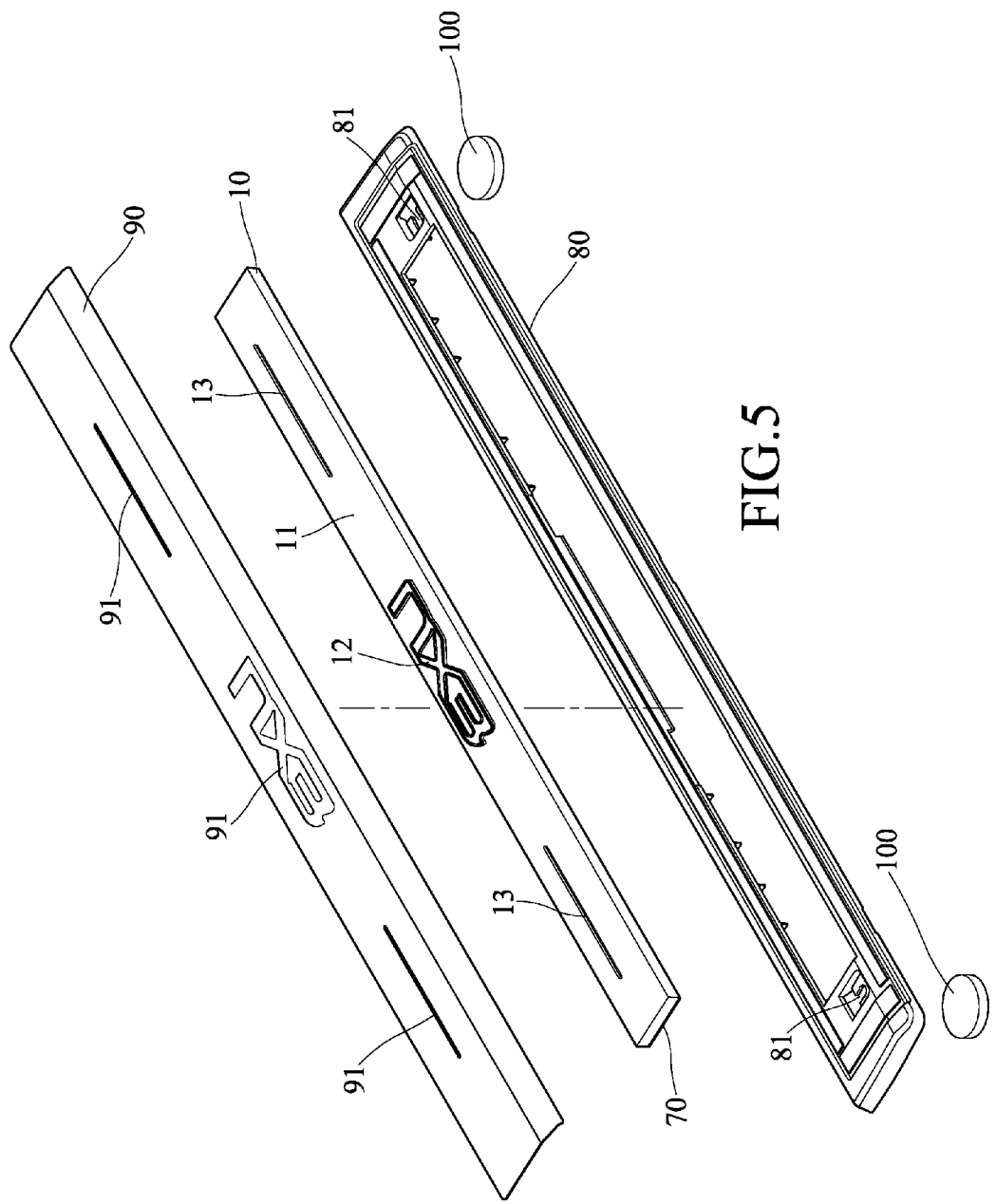
FIG. 5 is a perspective view showing the light emitting module of the present invention being used in a car threshold pedal.
Figure 6:
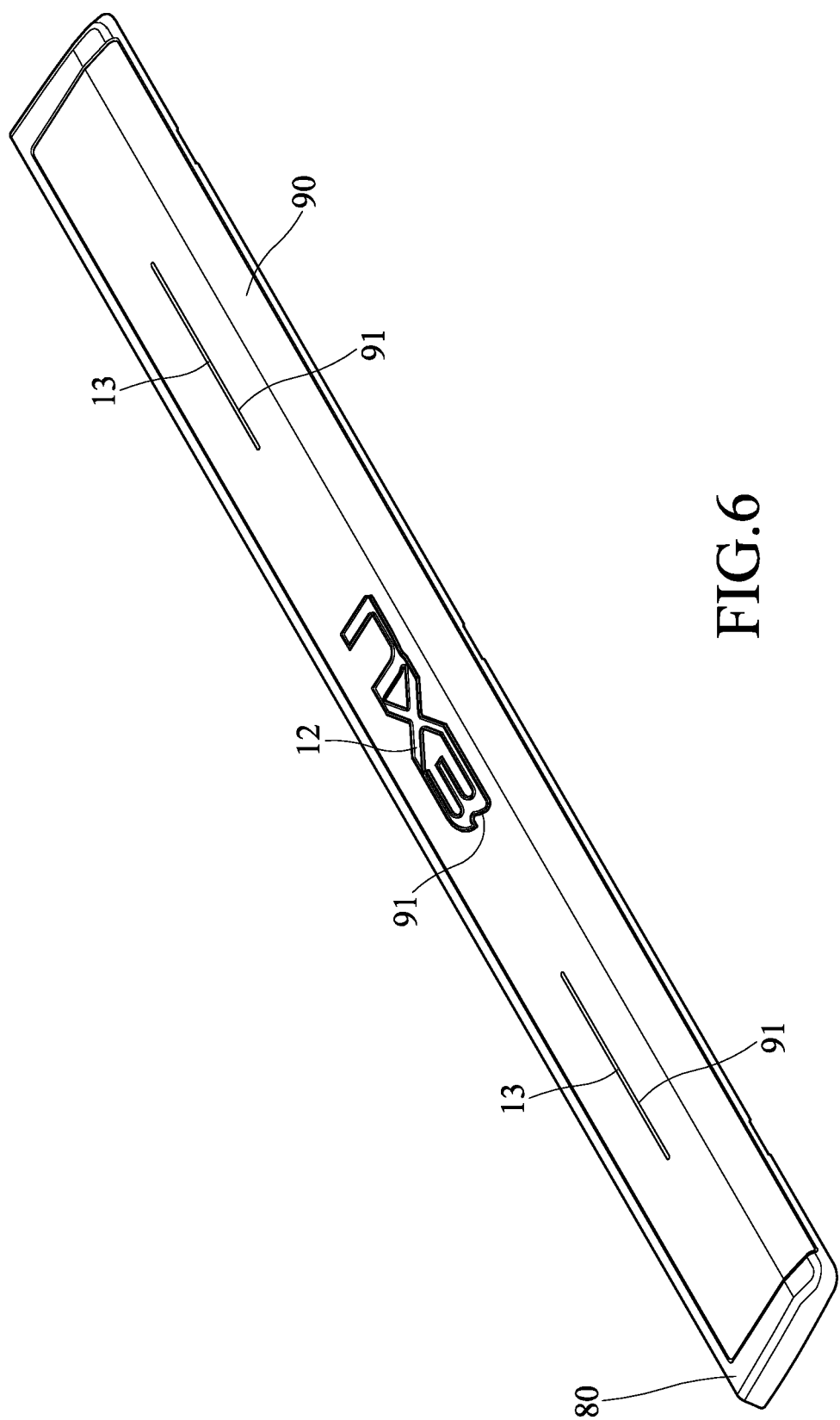
FIG. 6 is another perspective view showing the light emitting module of the present invention being used in the car threshold pedal.

FIG. 5 is a perspective view showing the light emitting module of the present invention being used in a car threshold pedal. FIG. 6 is another perspective view showing the light emitting module of the present invention being used in the car threshold pedal. With reference to FIGS. 5 and 6, the light emitting module is applied in the car threshold pedal, wherein the car threshold pedal includes a pedal 80 and a shielding panel 90, wherein the pedal 80 is served to receive the light emitting panel 10 and includes a plurality of holes 81 to retain the pedal 80 on the car threshold pedal, or the shielding panel 90 includes a plurality of magnets 100 fixed thereon to attach the pedal 80 on the car threshold pedal.

The shielding panel 90 is a metal sheet or a plastic sheet and is covered on the display surface 11 of the light emitting panel 10. The shielding panel 90 has a plurality of orifices 91 to expose the first raised pattern set 12 and the second raised pattern set 13 outward, such that the first raised pattern set 12 and the second raised pattern set 13 of the light emitting panel 10 are not shielded by the shielding panel 90 and are visible, thus enhancing an aesthetics appearance.

While we have shown and described various embodiments in accordance with the present invention, it is clear to those skilled in the art that further embodiments may be made without departing from the scope of the present invention.

What is claimed is:

1. A light emitting module without connecting with an external power supply comprising:
   a light emitting panel including a display surface on which a first raised pattern set and a second raised pattern set are formed;
   a plurality of lighting elements disposed on a bottom plate and secured in the light emitting panel with the bottom plate, each lighting element at least having a first light facing to the first raised pattern set and emitting light and a second light facing to the second raised pattern set and emitting light;
   a magnetic reed switch mounted in the light emitting panel and electrically connecting with the each lighting element;
   at least one cell secured in the light emitting panel and electrically coupled with the plurality of lighting elements and the magnetic reed switch.

2. The light emitting module without connecting with the external power supply as claimed in claim 1, wherein the first raised pattern set is selected from various letters, symbols, and patterns.

3. The light emitting module without connecting with the external power supply as claimed in claim 1, wherein the second raised pattern set is selected from various letters, symbols, and patterns.

4. The light emitting module without connecting with the external power supply as claimed in claim 1, wherein the light emitting panel includes a groove defined on a bottom end thereof to receive the plurality of lighting elements, the bottom plate, and the at least one cell.

5. The light emitting module without connecting with the external power supply as claimed in claim 1, wherein the light emitting panel includes a cover arranged on the bottom end thereof to close the plurality of lighting elements, the bottom plate, and the at least one cell in the light emitting panel.

6. The light emitting module without connecting with the external power supply as claimed in claim 5, wherein the cover is selected from a thin sheet and an adhesive waterproof sheet.

7. The light emitting module without connecting with the external power supply as claimed in claim 1, wherein the at least one cell is selected from a button cell.

8. The light emitting module without connecting with the external power supply as claimed in claim 1, wherein the each lighting element is selected from a light emitting diode and a light bulb.

9. A car threshold pedal with a light emitting module without connecting with an external power supply comprising:
   a light emitting panel connected with the car threshold pedal and including a display surface on which a first raised pattern set and a second raised pattern set are formed;
   a plurality of lighting elements disposed on a bottom plate and secured in the light emitting panel with the bottom plate, each lighting element at least having a first light facing to the first raised pattern set and emitting light and a second light facing to the second raised pattern set and emitting light;
   a magnetic reed switch mounted in the light emitting panel and electrically connecting with the each lighting element;
   at least one cell secured in the light emitting panel and electrically coupled with the plurality of lighting elements and the magnetic reed switch;
   a pedal served to receive the light emitting panel;
   a shielding panel covered on the display surface of the light emitting panel and having a plurality of orifices to expose the first raised pattern set and the second raised pattern set outward.

10. The car threshold pedal with the light emitting module without connecting with the external power supply as claimed in claim 9, wherein the pedal includes a plurality of holes to retain the pedal on the car threshold pedal.

11. The car threshold pedal with the light emitting module without connecting with the external power supply as claimed in claim 9, wherein the shielding panel includes a plurality of magnets fixed thereon to attach the pedal on the car threshold pedal.

12. The car threshold pedal with the light emitting module without connecting with the external power supply as claimed in claim 9, wherein the shielding panel is a metal sheet.

13. The car threshold pedal with the light emitting module without connecting with the external power supply as claimed in claim 9, wherein the shielding panel is a plastic sheet.

* * * * *